US011138895B2

(12) United States Patent
Shammout

(10) Patent No.: US 11,138,895 B2
(45) Date of Patent: *Oct. 5, 2021

(54) SYSTEM AND METHOD FOR FACILITATING CREATION OF AN EDUCATIONAL TEST BASED ON PRIOR PERFORMANCE WITH INDIVIDUAL TEST QUESTIONS

(71) Applicant: Bilal Ismael Shammout, Dubai (AE)

(72) Inventor: Bilal Ismael Shammout, Dubai (AE)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,225

(22) Filed: Jun. 5, 2020

(65) Prior Publication Data

US 2020/0372820 A1 Nov. 26, 2020

Related U.S. Application Data

(63) Continuation of application No. 14/728,808, filed on Jun. 2, 2015, now Pat. No. 10,713,964.

(51) Int. Cl.
*G09B 7/00* (2006.01)
*G06F 3/0484* (2013.01)

(52) U.S. Cl.
CPC ........... *G09B 7/00* (2013.01); *G06F 3/04842* (2013.01)

(58) Field of Classification Search
CPC ... G09B 5/00; G09B 5/02; G09B 5/04; G09B 5/06; G09B 5/067; G09B 5/065; G09B 5/08; G09B 5/10; G09B 5/12; G09B 5/14; G09B 7/00; G09B 7/06; G09F 17/18; G06Q 50/01; G06Q 50/20; G06F 3/04842; G06F 3/0484

See application file for complete search history.

(56) References Cited

U.S. PATENT DOCUMENTS

| | | | |
|---|---|---|---|
| 6,431,875 B1 | 8/2002 | Elliott | |
| 6,704,741 B1 | 3/2004 | Lively, Jr. | |
| 6,988,138 B1 | 1/2006 | Alcorn | |
| 7,165,012 B2 | 1/2007 | Swanson | |
| 8,545,232 B1 | 10/2013 | Bardige | |
| 8,755,737 B1 * | 6/2014 | Galen | G09B 5/00 434/352 |
| 9,418,567 B1 | 8/2016 | Chen | |
| 2002/0087560 A1 | 7/2002 | Bardwell | |

(Continued)

*Primary Examiner* — Robert J Utama
(74) *Attorney, Agent, or Firm* — Sheppard Mullin Richter & Hampton LLP

(57) ABSTRACT

In certain implementations, creation of an educational test may be facilitated based on prior performance with individual test questions. A user input indicating a subject matter for a test, one or more question categories related to the subject matter, and a questionee group for which the test is intended may be received. A plurality of questions may be obtained based on the user input. For each question of the plurality of questions, a question performance metric value associated with the question (that is calculated based on prior performance of one or more questionees with the question) may be obtained. A test performance metric value associated with the test may be calculated based on the question performance metric values associated with at least some questions of the plurality of questions. The at least some questions and the test performance metric value may be provided for presentation on a user interface.

29 Claims, 7 Drawing Sheets

(56) References Cited

U.S. PATENT DOCUMENTS

| | | | |
|---|---|---|---|
| 2004/0018479 A1* | 1/2004 | Pritchard | G09B 7/02 |
| | | | 434/350 |
| 2004/0259062 A1 | 12/2004 | Heller | |
| 2004/0267607 A1 | 12/2004 | Maddux | |
| 2005/0125196 A1 | 6/2005 | Swanson | |
| 2006/0099561 A1 | 5/2006 | Griph | |
| 2008/0102435 A1 | 5/2008 | Rogers | |
| 2009/0018986 A1 | 1/2009 | Alcorn | |
| 2009/0047648 A1 | 2/2009 | Ferreira | |
| 2009/0130644 A1 | 5/2009 | Lee | |
| 2009/0170058 A1 | 7/2009 | Walker | |
| 2010/0255453 A1 | 10/2010 | Chincarini | |
| 2011/0097692 A1* | 4/2011 | Homan | G09B 19/18 |
| | | | 434/129 |
| 2011/0117534 A1 | 5/2011 | Berger | |
| 2012/0288844 A1* | 11/2012 | Anand | G09B 7/08 |
| | | | 434/353 |
| 2014/0227675 A1 | 8/2014 | Budhu | |
| 2014/0234824 A1 | 8/2014 | Schepman | |
| 2014/0308649 A1 | 10/2014 | Bergan | |
| 2015/0064680 A1 | 3/2015 | Lee | |
| 2015/0325138 A1 | 11/2015 | Selinger | |
| 2016/0308803 A1 | 10/2016 | Kim | |
| 2017/0061284 A1* | 3/2017 | Amano | G06N 5/025 |

* cited by examiner

Select questions to add to the test. As you add (or remove) questions, various test metric values will be presented in the right pane.

Subject Matter A: Question Category X

QX2 — Difficulty Level: 3
Avg. Time to Correctly Answer: 2 Min. 5 Sec.
Avg. Time to Incorrectly Answer: 2 Min. 1 Sec.

QX3 — Difficulty Level: 5
Avg. Time to Correctly Answer: 5 Min. 8 Sec.
Avg. Time to Incorrectly Answer: 4 Min. 35 Sec.

QX5 — Difficulty Level: 1
Avg. Time to Correctly Answer: 1 Min. 2 Sec.
Avg. Time to Incorrectly Answer: 2 Min. 1 Sec.

⋮

Subject Matter A: Question Category Y

QY1 — Difficulty Level: 2
Avg. Time to Correctly Answer: 2 Min. 2 Sec.
Avg. Time to Incorrectly Answer: 2 Min. 3 Sec.

QY3 — Difficulty Level: 4
Avg. Time to Correctly Answer: 3 Min. 8 Sec.
Avg. Time to Incorrectly Answer: 3 Min. 42 Sec.

⋮

Questions Added to Test

1. QX1
2. QX4
3. QX6
4. QX7
5. QY2

Test Difficulty Level: 3.2

Estimated Time to Complete Test: 10 Min. 8 Sec.

Question Categories Still Needed to Match Selected Categories Compos.:
- Y
- Z

Below are recommend questions sets for the test based on your selected criteria (e.g., test difficulty level of 3.5, estimated completion time of 1 hour, etc.). Select any question set pane to view the corresponding question set, to modify the questions in the question set, or to generate the test.

Question Set 1

Question Set Includes: QX1, QX4, QX5, QX7, QY2, QY5, QY8, QZ8 ...
Test Difficulty Level: 3.5
Estimate Time to Complete Test: 1 Hour 0 Min. 4 Sec.
Closest to Composition of Selected Weighted Question Categories: 100%

Question Set 2

Question Set Includes: QX2, QX4, QX5, QY1, QY4, QY7, QY9, QZ3 ...
Test Difficulty Level: 3.5
Estimate Time to Complete Test: 1 Hour 0 Min. 5 Sec.
Closest to Composition of Selected Weighted Question Categories: 100%

Question Set 3

Question Set Includes: QX3, QX4, QX5, QX8, QY4, QY8, QY11, QZ2 ...
Test Difficulty Level: 3.5
Estimate Time to Complete Test: 1 Hour 0 Min. 7 Sec.
Closest to Composition of Selected Weighted Question Categories: 98%

Question Set 4

Question Set Includes: QX4, QX5, QX8, QY1, QY2, QY8, QY9, QZ4 ...
Test Difficulty Level: 3.4
Estimate Time to Complete Test: 1 Hour 0 Min. 4 Sec.
Closest to Composition of Selected Weighted Question Categories: 100%

Question Set 5

Question Set Includes: QX1, QX4, QX5, QX7, QY2, QY5, QY8, QZ8 ...
Test Difficulty Level: 3.4
Estimate Time to Complete Test: 1 Hour 0 Min. 5 Sec.
Closest to Composition of Selected Weighted Question Categories: 98%

SYSTEM AND METHOD FOR FACILITATING CREATION OF AN EDUCATIONAL TEST BASED ON PRIOR PERFORMANCE WITH INDIVIDUAL TEST QUESTIONS

CROSS-REFERENCE TO RELATED APPLICATION

This application is a continuation of pending U.S. patent application Ser. No. 14/728,808, filed Jun. 2, 2015, entitled "SYSTEM AND METHOD FOR FACILITATING CREATION OF AN EDUCATIONAL TEST BASED ON PRIOR PERFORMANCE WITH INDIVIDUAL TEST QUESTIONS", which is hereby incorporated herein by reference in its entirety.

FIELD OF THE INVENTION

The invention relates to creation of an educational test and benchmarking the test results, and, more particularly, to creation of an educational test based on prior performance with individual test questions, measurement of the performance of the individuals being tested, the instructors, or the institutions, and benchmarking of the test results.

BACKGROUND OF THE INVENTION

Among other advantages, standardized testing across various schools, districts, or states enable students of the various schools, districts, or states to be compared, and are objective in nature. The process of creating and administering typical standardized tests is, however, complex and expensive. Moreover, with typical standardized testing, test results that are generally used to benchmark the performance of a student on a test are limited to the test results of other students who took the same test. While standardized testing provides a valuable means for the objective comparisons, the very low frequency of standardized testing makes them only snapshots in time. Standardized testing does not offer a means for continuous monitoring and comparison of educational process. These and other drawbacks exist.

SUMMARY OF THE INVENTION

The invention addressing these and other drawbacks relates to methods, apparatuses, and/or systems for facilitating creation of an educational test based on prior performance with individual test questions, measurement of the performance of the individuals being tested, the instructors, or the institutions, and benchmarking of the test results.

In accordance with one aspect of the invention, an electronic test management platform that allows instructors (or other user) to efficiently and effectively create tests and assess the performance of their students against other students (e.g., regardless of whether the other students have taken the same tests) may be provided.

In an implementation, question performance metric values associated with potential questions for an educational test, a test performance metric value associated with the test (calculated based on the question performance metric values), or other performance information may be utilized to facilitate creation of the test. As an example, a database of questions may be queried based on a subject matter, a question category, an intended questionee group, or other information to obtain a plurality of questions for a test. One or more of the plurality of questions (obtained from the database) may then be selected for the test based on question performance metric values associated with the questions, a test performance metric value associated with the test, or other performance information.

In an implementation, a test may be generated based on one or more user-specified test performance benchmark values for the test. As an example, a user may specify an intended difficulty level for the test, an intended duration of the test, an intended question composition for the test (e.g., with respect to percentage of each question category for the test), a date and time for which the test will be administered, or other criteria. The test may be generated responsive to the user specifying the test criteria.

In an implementation, question performance metric values may be calculated and/or updated for individual questions, and the calculated and/or updated question performance metric values may be stored in association with their respective questions in a question database. In an implementation, information regarding questionees who were given the questions to answer, information regarding the performance of the questionees with respect to the questions, or other information may be stored. The stored information may be utilized to calculate (or update) the question performance metric values for the questions. The question performance metric values may be stored in association with the questions (e.g., as performance information in a testing management database). Stored information regarding a questionee may comprise a questionee identifier (e.g., an anonymous identifier), one or more questionee group which with the questionee is related (e.g., educational level, age group, school, school region, state, country, etc.), or other information. Stored information regarding the performance of a questionee with respect to a question may comprise whether the questionee answered the question, how much time the questionee took to answer the question, whether the questionee correctly answered the question, or other information.

In an implementation, a previously calculated performance metric value associated with a question may be updated based on performance of a new questionee with the question. As an example, when a test (comprising the question) is provided to a questionee who has not previously been presented with the question, performance of the questionee with the question (and other questions on the test) may be monitored. Information regarding the performance of the questionee may then be utilized to update performance metric values associated with the question.

In an implementation, performance of one or more questionees may be analyzed and/or compared to performance of one or more other questionees. As an example, performance of each questionee on each question of a test, each question category of the test, or the overall test may be compared with performance of his/her peers within the same questionee group that took the test (e.g., 6th grade students who took the test, 6th grade in the same state who took the test, 6th grade students within the same school who took the test, etc.) on each question of a test, each question category of the test, or the overall test, respectively.

In an implementation, performance of one or more instructors may be analyzed and/or compared to performance of one or more other instructors. As an example, performance of instructors may be determined based on performance of the respective students of the instructors. Performance metric values associated with an instructor may comprise (1) average amounts of time that the instructor's students spent on particular questions of a test, (2) average amounts of time that the instructor's students spent on particular question categories of the test, (3) an average amount of time that the instructor's students spent on the overall test, (4) average percentages of questions that the instructor's students correctly answered in the particular question categories of the test, (5) an average percentage of questions that the instructor's students correctly answered in the overall test, or (6) other performance metric values. Performance metric values associated with one or more other instructors (with which the performance metric values of the instructor may be compared) may comprise (1) average amounts of time that the other instructors' students spent on the particular questions, (2) average amounts of time that the other instructors' students spent on the particular question categories of similar tests, (3) an average amount of time that the other instructors' students spent on the similar tests, (4) average percentages of questions that the other instructors' students correctly answered in the particular question categories of the similar tests, (5) an average percentage of questions that the other instructors' students correctly answered in the similar tests, or (6) other performance metric values.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIGS. 2 and 3 are exemplary illustrations of user interfaces that facilitate creation of an education test based on prior performance with individual test questions, in accordance with aspects of the invention.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Exemplary System Description

Figure 1:
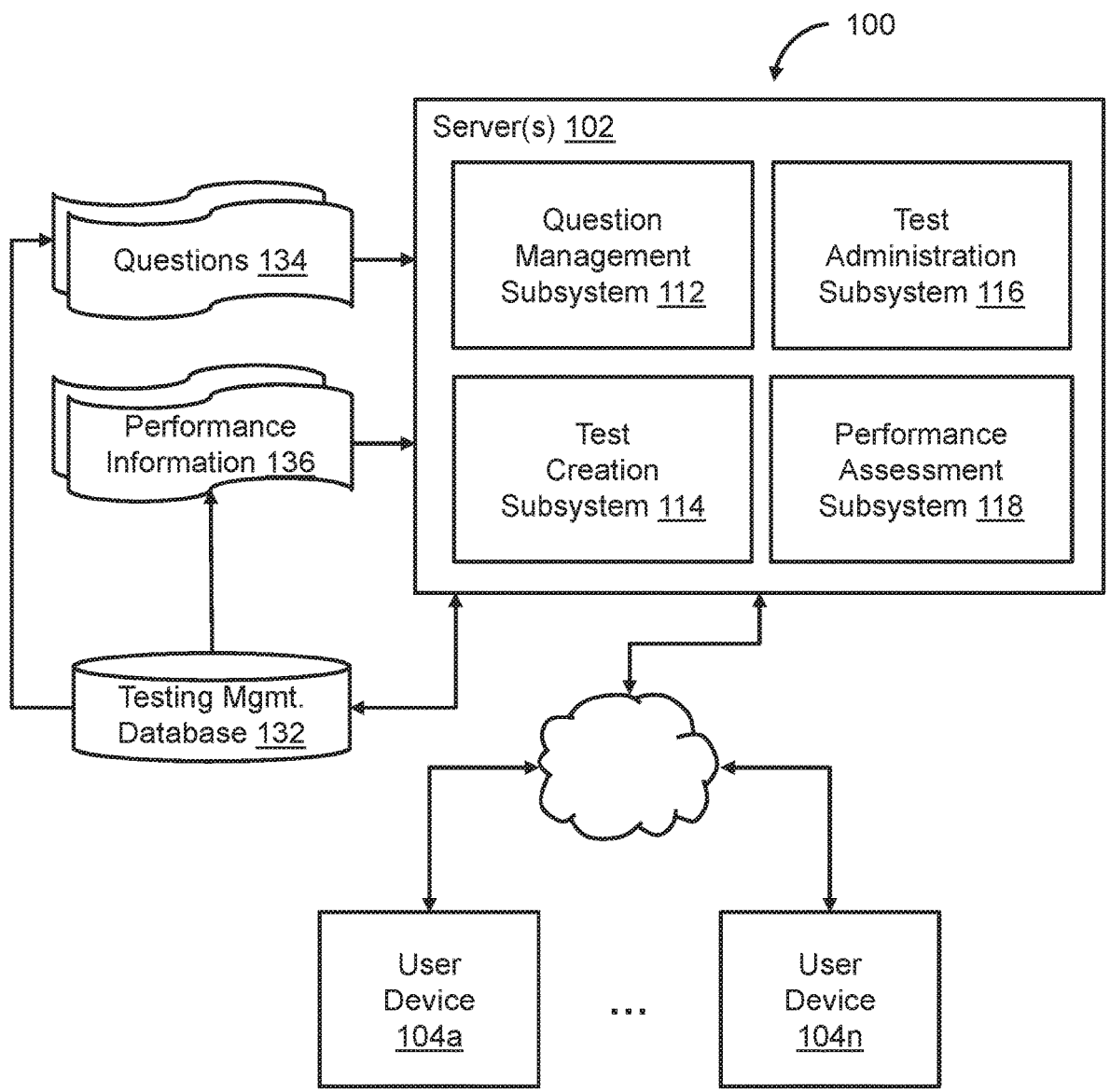
FIG. 1 is an exemplary illustration of a system for facilitating creation of an educational test based on prior performance with individual test questions, in accordance with an aspect of the invention.

FIG. 1 is an exemplary illustration of a system 100 for facilitating creation of an educational test based on prior performance with individual test questions, in accordance with an aspect of the invention. As shown in FIG. 1, system 100 may comprise server 102 (or multiple servers 102). Server 102 may comprise question management subsystem 112, test creation subsystem 114, test administration subsystem 116, performance assessment subsystem 118, or other components.

System 100 may further comprise user device 104 (or multiple user devices 104). User device 104 may comprise any type of mobile terminal, fixed terminal, or other device. By way of example, user device 104 may comprise a desktop computer, a notebook computer, a netbook computer, a tablet computer, a smartphone, a navigation device, an electronic book device, a gaming device, or other user device. Users may, for instance, utilize one or more user devices 104 to interact with server 102 or other components of system 100. It should be noted that, while one or more operations are described herein as being performed by components of server 102, those operations may, in some implementations, be performed by components of user device 104.

In some implementations, the various computers and subsystems illustrated in FIG. 1 may comprise one or more computing devices that are programmed to perform the functions described herein. The computing devices may include one or more electronic storages (e.g., testing management database 132, or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Attention will now be turned to a more detailed description of various implementations comprising one or more features related to creation of an educational test based on prior performance with individual test questions, measurement of the performance of the individuals being tested, and benchmarking of the test results. It should be noted that features described herein may be implemented separately or in combination with one another.

Test Creation

In an implementation, question performance metric values associated with potential questions for an educational test, a test performance metric value associated with the test (calculated based on the question performance metric values), or other performance information may be utilized to facilitate creation of the test. As an example, a question performance metric value associated with a question may comprise an estimated difficulty level assigned to the question (e.g., based on user ratings by instructors, questionees, or other users, an average amount of time that questionees took to answer the question, a percentage of questionees who correctly answered the question, etc.), an average amount of time that questionees took to correctly answer the question, an average amount of time that questionees took to incorrectly answer the question, a percentage of questionees who correctly answered the question, a percentage of questionees who incorrectly answered the question, or other performance metric value. A test performance metric value associated with a test may comprise an estimated test difficulty level assigned to the test (e.g., based on ratings by instructors, questionees, or other users, an average amount of time to complete the test, a percentage of questionees who answered all questions on the test or a threshold number of questions on the test, raw test scores of the questionees for the test, etc.), an estimated time to complete the test (e.g., based on an average amount of time to complete the test, a percentage of questionees who completed all questions on the test or a threshold number of questions on the test, a summation of the average times for the questions on the test, etc.), or other performance metric values.

In an implementation, test creation subsystem 114 may receive a user input related to creation of a test. The user input may indicate a subject matter, one or more question categories related to the subject matter, a questionee group for which the test is intended, or other information for creating the test (e.g., an intended difficulty level for the test, the weight of each question category for the test, an intended duration of the test, a date and time on which the test is to be administered, etc.). Based on the user input, test creation subsystem 114 may obtain a plurality of questions that correspond to the subject matter, the question categories, the intended questionee group, etc. In one scenario, for example, an instructor (or other user) may utilize a test creation user interface to select Mathematics as a subject matter (e.g., from a list of available subject matters) to be tested and 6th grade students as a questionee group for which the test is intended. Responsive to the selection of the subject matter and the questionee group, a plurality of question categories related to Grade 6 Mathematics may be presented on the user interface. The available question categories may, for example, comprise exponents and square roots, decimals, fractions, pre-algebra, algebra, geometry, coordinate graphs, consumer math, data and graphs, statistics, or other question categories. When the instructor selects one or more of the available question categories, a question database (e.g., separate or a part of testing management database 132) may be queried with the criteria "Mathematics," "Grade 6," and the selected question categories to obtain questions that correspond to the selected question categories and Grade 6 Mathematics for presentation on the user interface.

For each question of a plurality of questions obtained as potential questions for a test, test creation subsystem 114 may obtain performance information associated with the question. The performance information may comprise (for each question) one or more question performance metric values associated with the question. The question performance metric values may comprise an estimated difficulty level assigned to the question (e.g., based on user ratings, an average amount of time that questionees took to answer the question, a percentage of questionees who correctly answered the question, a percentage of questionees who incorrectly answered the question, etc.), an average amount of time that questionees took to correctly answer the question, an average amount of time that questionees took to incorrectly answer the question, a percentage of questionees who correctly answered the question, a percentage of questionees who incorrectly answered the question, or other performance metric values.

In an implementation, the plurality of questions that are obtained from a question database (based on a selected questionee group and/or other factors) may comprise one or more questions that correspond to a plurality of questionee groups (e.g., education levels, age group, etc.). As an example, each of the plurality of questionee groups may correspond to a different educational level (e.g., Grades K-12 or other educational levels). In one use case, an Algebra question suitable for Grades 6-9 may obtained as a potential question for a test based on an instructor's selection of Mathematics as a subject matter for the test, Algebra as a question category for the test, and Grade 6 as a questionee group for which the test is intended. Although the particular Algebra question may be suitable for the different grade levels, the same Algebra question may be associated with different question performance metric values of a particular question metric for each of the different grade levels. In a further use case, for example, when presented as a potential question for the test, the Algebra question may be presented with a difficulty level of 3.2 as a result of the test being intended for 6th graders. However, if the Algebra question had been obtained for a test intended for 7th graders, the Algebra question may alternatively be presented with a difficulty level of 2.8. Likewise, in some use cases, with respect to other performance metrics (e.g., average time to correct or incorrectly answer the question), the question may be presented with a different performance metric value based on the grade level for which the test is intended.

In an implementation, question performance metric values associated with a question may be calculated based on prior performance of one or more questionees with the question. In an implementation, the question performance metric values may be calculated with respect to a questionee group. As an example, a first difficulty level associated with the question and the 6th grade level may be calculated based on prior performance of one or more 6th graders with the question (e.g., based on an average amount of time that 6th grade students took to answer the question, a percentage of 6th grade students who correctly answered the question, etc.). A second difficulty level associated with the question and the 7th grade level may be calculated based on prior performance of one or more 7th graders with the question. When the question is presented as a potential question for a test intended for 6th graders, the question may be presented with the first difficulty level (associated with the question and the 6th grade level). On the other hand, when the question is presented as a potential question for a test intended for 7th graders, the question may be presented with the second difficulty level (associated with the question and the 7th grade level).

As another example, a first average amount of time for 6th graders to correctly answer the question may be calculated based on the amounts of time that 6th grade students (who correctly answered the question) took to answer the question (e.g., when those 6th grade students were previously tested on the question). A second average amount of time for 7th graders to correctly answer the question may be calculated based on the amounts of time that 7th grade students (who correctly answered the question) took to answer the question (e.g., when those 7th graders were previously tested on the question). When the question is presented as a potential question for a test intended for 6th graders, the question may be presented with the first average amount of time to indicate an estimated amount of time that the intended 6th grade student group will take to correctly answer the question. On the other hand, when the question is presented as a potential question for a test intended for 7th graders, the question may be presented with the second average amount of time to indicate an estimated amount of time that the intended 7th grade student group will take to correctly answer the question.

In an implementation, performance assessment subsystem 118 may calculate a test performance metric value associated with a test based on question performance metric values associated with questions for the test. Test creation subsystem 114 may provide the questions and the test performance metric value for presentation on a user interface. As an example, with respect to FIG. 2, a plurality of questions (e.g., questions QX1-QX7, questions QY-QY3, etc.) may be obtained from a question database (e.g., testing management database 132) as potential questions for a test based on a user selection of (1) a subject matter for the test (e.g., Subject Matter A), (2) question categories (related to the subject matter) for the test (e.g., Question Category X, Question Category Y, etc.), (3) a questionee group for which the test is intended (e.g., 6th grade students in a particular school region, students within a particular age group in a certain state), (4) an intended difficulty level for the test (e.g., difficulty levels 1-5), (5) the weight of each question category for the test (e.g., 40% of questions to be related to Question Category X, 30% of questions to be related to Question Category Y, etc.), (5) an intended duration of the test, or (6) other criteria. As shown in FIG. 2, the plurality of questions may be presented on a user interface 200 along with their respective associated question performance metric values (e.g., difficulty level, average time to correctly answer, average time to incorrectly answer, etc.). As the user selects one or more of the questions to be added to the test (or removes questions from the test), one or more test performance metric values associated with the test may be calculated and presented on the user interface 200.

In one scenario, with respect to FIG. 2, responsive to the addition of questions QX1, QX4, QX6, QX7, and QY2 to the test, a test difficulty level is calculated for the test (e.g., a difficulty level of 3.2) based on the individual question difficulty levels of questions QX1, QX4, QX6, QX7, and QY2 (e.g., based on a weighted mean of the question difficulty levels or other average of the question difficulty levels). In another scenario, responsive to the addition of the questions, an estimated time to complete the test may be calculated based on the individual average times for answering the respective added questions (e.g., the average times to correctly answer the questions, the average times to incorrectly answer the questions, etc.), the individual percentages of questionees who correctly (or incorrectly) answered the respective added questions, etc. In other scenarios, other test performance metric values may be calculated for the test (e.g., based on individual question performance metric values associated with the respective questions added to the test).

In an implementation, upon obtaining a plurality of questions that correspond to one or more user-specified criteria (e.g., a subject matter, related question categories, an intended questionee group, etc.) for a test, test creation subsystem 114 may provide the plurality of question for presentation on a user interface. In response, test creation subsystem 114 may receive one or more user inputs indicating selection of one or more questions (of the plurality of questions) for inclusion in the test. Responsive to the selection, performance assessment subsystem 118 may calculate one or more test performance metric values associated with the test based on question performance metric values associated with the selected questions. As an example, with respect to FIG. 2, a test difficulty level of 3.2 for a test and a current estimated time of 10 minutes and 8 seconds to complete the test (when the test includes the selected 5 questions) may be calculated (and presented on user interface 200) responsive to the selection of questions QX1, QX4, QX6, QX7, and QY2 (for inclusion in the test). In one use case, the question difficulty level for each of the selected questions may be utilized to calculate the test difficulty level. In another use case, the average amount of time previously taken by questionees to correctly answer individual ones of the selected questions and/or the average amount of time previously taken by questionees to incorrectly answer individual ones of the selected questions may be utilized to calculate the estimated time to complete the test.

In an implementation, the test performance metric values may be calculated for the test in real-time as questions are selected for inclusion in the test. As an example, with respect to FIG. 2, the test difficulty level of 3.2 and the estimated completion time of 10 minutes and 8 seconds may be calculated for the test responsive to a user selecting questions QX1, QX4, QX6, QX7, and QY2 to be added to the test. When the user selects an additional question to be added to the test, performance assessment subsystem 118 may calculate an updated test difficulty level for the test based on the question difficulty levels associated the previously added questions and the question difficulty level associated with the additional question. Performance assessment subsystem 118 may also calculate an updated estimated completion time for the test based on the average completion times associated with the previously added questions and the average completion times associated with the additional question. Test creation subsystem 114 may then provide the updated test difficulty level, the updated estimated completion time, and the updated selected set of questions for presentation on user interface 200.

In an implementation, test creation subsystem 114 may assess one or more test criteria to be satisfied, and may notify a user regarding whether there are test criteria that have not been satisfied along with one or more actions that can be taken to satisfy unmet test criteria. As an example, the test criteria to be satisfied for a test may comprise default test criteria for the test, user-specified test criteria for the test, or other test criteria. Additionally, or alternatively, test criteria for the test may be inferred based on user preferences, a instructor's syllabus and/or class materials (e.g., homework previously given during a semester or other school time period, quizzes or other tests previously given during the semester or other school time period, etc.), or other test criteria.

In one scenario, with respect to FIG. 2, during creation of the test, a user may specify weights of the question categories (e.g., specifying the percentages of the respective question categories) that are to be included in the test (e.g., 50% of questions related to Question Category X, 30% of question related to Question Category Y, 20% of questions related to Question Category Z, etc.). As shown in FIG. 2, as the user selects questions to be added to the test, an indication of the types of questions that should be further added to the test may be presented on user interface 200. The types of questions (that should be further added to the test) may comprise questions that are needed to satisfy a question composition corresponding to the user-specified weighted question categories. For example, after the user selects questions QX1, QX4, QX6, QX7, and QY2 to be included for the test, the question composition may comprise 80% Question Category X questions and 20% Question Category Y questions. As such, as shown in FIG. 2, an indication that questions related to Question Category Y and questions related to Question Category Z should be added to the test to satisfy the question composition corresponding to the user-specified weighted question categories. It should be noted that a question may be related to one or more question categories. By adding a question to a test, each of the question categories related to the added question may, for example, be increased in percentage for the question composition of the test.

In another scenario, a recommended question composition for a test (e.g., comprising respective percentages of questions related to various question categories) intended for students in a particular class may be calculated based on the composition of the question categories in materials previously given to the students in the class. As an example, test creation subsystem 114 may assess the composition of question categories in a syllabus provided to the students in the class during a semester, the composition of question categories in homework previously given to the students during the semester, the composition of question categories in quizzes or other tests previously given to the students during the semester, or other composition of question categories in other class materials provided during the semester. Test creation subsystem 114 may then calculate the recommended question composition for the test (e.g., a mid-semester exam, a final exam, etc.) based on the compositions of question categories in the class materials, and utilize the recommended question composition to recommend in real-time the types of questions that should be added to the test to satisfy the recommended question composition (e.g., as a user is adding questions to the test, the recommendations regarding the types of questions to be further added to the test may be updated in real-time).

User-Specified Test Benchmarks

In an implementation, test creation subsystem 114 may generate a test based on one or more user-specified test performance benchmark values for the test. As an example, a user may specify an intended difficulty level for the test, an intended duration of the test, an intended question composition for the test (e.g., with respect to percentage of each question category for the test), a date and time for which the test will be administered, or other criteria. Responsive to the user specifying the test criteria, test creation subsystem 114 may generate the test and/or provide the test to test administration subsystem 116 without further user input (e.g., such that, without further user input, the questions are automatically selected for the test and the test is provided to students on the specified date and time).

As another example, with respect to FIG. 3, a user may specify an intended difficulty level for the test, and an intended duration of the test, or other test performance benchmark values for the test. Based on the user-specified test performance benchmark values, test creation subsystem 114 may generate one or more question sets for the test. Each of the question sets may, for example, comprise a complete set of recommended questions for the test. In one scenario, as shown in FIG. 3, the user may specify that he/she wants a test to have a difficulty level about 3.5 and a completion time of about 1 hour. Based on these criteria (along with one or more other criteria, such as a subject matter, question categories, the intended questionee group, etc.), test creation subsystem 114 may generate Question Set 1, Question Set 2, Question Set 3, Question Set 4, Question Set 5, etc., and present the generated question sets on user interface 300 to enable the user to: (1) generate the test so that the test comprises one of the generated question sets, (2) view one of the question sets, (3) modify one of the question sets so that the test comprises the modified question set (e.g., select another question from a question database to add to the question set, make up a new question to add to the question set, etc.), (4) or perform other operations. As shown in FIG. 3, each of the question sets may be generated such that the question set has test performance metric values that correspond to the user-specified test performance benchmark values. For example, test creation subsystem 114 may select questions for each of the question sets based on their respective question performance metric values to generate question sets having test performance metric values that are close to the user-specified test performance benchmark values.

In another scenario, the user may specify that he/she wants a test to have certain question categories and the weights of the respective question categories for the test. Based on the user-specified question categories and weights, test creation subsystem 114 may generate one or more question sets for the test. With respect to FIG. 3, for example, based on the user-specified test criteria (e.g., test difficulty level, completion time, question categories and associated weights, etc.), test creation subsystem 114 may generate question sets that correspond to the user-specified test criteria. For example, test creation subsystem 114 may select questions for each of the question sets based on their respective question performance metric values and their associated question categories to generate question sets having: (1) test performance metric values that are close to the user-specified test performance benchmark values and (2) a question composition that closely reflects the user-specified weights for the question categories specified for the test.

In a further scenario, test creation subsystem 114 may rank the question sets (that are generated based on the user-specified criteria). The ranking may be based on the test performance metric values associated with the question sets, the question compositions associated with the question sets, or other factors. As shown in FIG. 3, for example, the question sets may be ranked based on the closeness of test performance metric values (e.g., test difficult levels, test completion times, etc.) of the question sets to the user-specified test performance benchmark values (e.g., test difficulty benchmark level, test benchmark completion time, etc.).

Question Performance Metric Value Updates

In an implementation, question performance metric values may be calculated and/or updated for individual questions, and the calculated and/or updated question performance metric values may be stored in association with their respective questions in a question database (e.g., storing questions 134 and associated performance information 136 in testing management database 132). In an implementation, question management subsystem 112 may store information regarding questionees who were given the questions to answer, information regarding the performance of the questionees with respect to the questions, or other information. Performance assessment subsystem 118 may utilize the stored information to calculate (or update) the question performance metric values for the questions. Question management subsystem 112 may store the question performance metric values in association with the questions (e.g., as performance information 136 in testing management database 132). Stored information regarding a questionee may comprise a questionee identifier (e.g., an anonymous identifier), one or more questionee group which with the questionee is related (e.g., educational level, age group, school, school region, state, country, etc.), or other information. Stored information regarding the performance of a questionee with respect to a question may comprise whether the questionee answered the question, how much time the questionee took to answer the question, whether the questionee correctly answered the question, or other information.

As an example, a question difficulty level may be calculated for a question based on how long each questionee took to answer the question (e.g., an average amount of time), whether the question was answered correctly by the questionee, how many of the questionees correctly answered the question (e.g., a percentage of questionees who correctly answered the question), how many of the questionees didn't provide an answer the question, or other factors. An average amount of time for correctly answering the question may be calculated by determining a mean, medium, or mode of the amounts of time that questionees previously took to correctly answer the question. An average amount of time for incorrectly answering the question may be calculated by determining a mean, medium, or mode of the amounts of time that questionees took to incorrectly answer the question.

As a further example, a question difficulty level for a question, an average amount of time for correctly answering the question, an average amount of time for incorrectly answering the question, or other question performance metric values may be calculated with respect to a particular questionee group. In one use case, if the questionee group are 6th grade students, a question difficulty level associated with the question and the questionee group may calculated based on how long each 6th grade student took to answer the question, whether the question was correctly answered by the 6th grade student, how many of the 6th grade students correctly answered the question, how many of the 6th grade students didn't provide an answer the question, or other factors. As such, for example, when creating a test for 6th grade students, the question difficulty levels calculated with respect to 6th grade students may be utilized to facilitate the creation of the test. Likewise, in another use case, an average amount of time for 6th grade students to correctly answer the question may be calculated by determining a mean, medium, or mode of the amounts of time that 6th grade students previously took to correctly answer the question. An average amount of time for 6th grade students to incorrectly answer the question may be calculated by determining a mean, medium, or mode of the amounts of time that 6th grade students took to incorrectly answer the question. When creating a test for 6th grade students, the foregoing averages with respect to 6th grade students may be utilized to facilitate the creation of the test.

In an implementation, performance assessment subsystem 118 may update a previously calculated performance metric value associated with a question based on performance of a new questionee with the question. As an example, when a test (comprising the question) is provided to a questionee who has not previously been presented with the question, performance of the questionee with the question (and other questions on the test) may be monitored. Information regarding the performance of the questionee may then be utilized to update performance metric values associated with the question. In one scenario, a question difficulty level associated with the question may be updated by recalculating the question difficulty level using historical information regarding performance of previous questionees with the question and the information regarding the performance of the questionee with the question. If the questionee answered the question correctly, an average amount of time for correctly answering the question (e.g., previously calculated based on amounts of time that previous questionees took to correctly answer the question) may be updated by recalculating the average amount of time for correctly answering the question using the amounts of time that previous questionees took to correctly answer the question and the amount of time that the questionee took to correctly answer the question. If the questionee answered the question incorrectly, an average amount of time for incorrectly answering the question may be updated by recalculating the average amount of time for incorrectly answering the question using the amounts of time that previous questionees took to incorrectly answer the question and the amount of time that the questionee took to incorrectly answer the question.

In an implementation, performance assessment subsystem 118 may update a previously calculated question performance metric value associated with a question based on the previously calculated performance metric value and performance of a new questionee with the question. As an example, at least some information previously used to calculate the associated performance metric value need not be used to recalculate an updated version of the performance metric value for the question. As such, question performance metric values associated with questions may be updated more efficiently.

As another example, a first weight may be assigned to one or more previously calculated question performance metric values associated with the question, and a second weight may be assigned to performance of the questionee with the question. In one use case, a first weighted question difficulty level may be calculated based on the first weight and a previously calculated question difficulty level associated with the question. A second weighted question difficulty level may be calculated based on the second weight and an estimated level of difficulty that the questionee had with the question (e.g., calculated based on whether the questionee answered the question correctly, an amount of time that the questionee took to answer the question, etc.). The updated question difficulty level may be calculated for the question based on the first weighted question difficulty level and the second weighted question difficulty level. In some use cases, the first weight may be greater than the second weight (or vice versa). For example, the first weight may be equal to the number of questionees whose performance the previously calculated question difficulty level is based on, and the second weight may be 1 to reflect the single questionee whose performance the estimated level of difficulty (of the questionee with the question) is based on.

In another use case, where the questionee correctly answered the question, a first weighted average amount of time for correctly answering the question may be calculated based on the first weight and a previously calculated average amount of time for correctly answering the question. A second weighted amount of time for correctly answering the question may be calculated based on the second weight and an amount of time that the questionee took to correctly answer the question. The updated average amount of time for correctly answering the question may be calculated based on the first weight average amount of time and the second weighted amount of time.

In a further use case, where the questionee incorrectly answered the question, a first weighted average amount of time for incorrectly answering the question may be calculated based on the first weight and a previously calculated average amount of time for incorrectly answering the question. A second weighted amount of time for incorrectly answering the question may be calculated based on the second weight and an amount of time that the questionee took to incorrectly answer the question. The updated average amount of time for incorrectly answering the question may be calculated based on the first weight average amount of time and the second weighted amount of time.

Questionee Performance Analysis

In an implementation, performance of one or more questionees may be analyzed and/or compared to performance of one or more other questionees. As an example, performance assessment subsystem 118 may compare performance of each questionee on each question of a test, each question category of the test, or the overall test with performance of his/her peers within the same questionee group that took the test (e.g., 6th grade students who took the test, 6th grade in the same state who took the test, 6th grade students within the same school who took the test, etc.) on each question of a test, each question category of the test, or the overall test, respectively.

Figure 4:
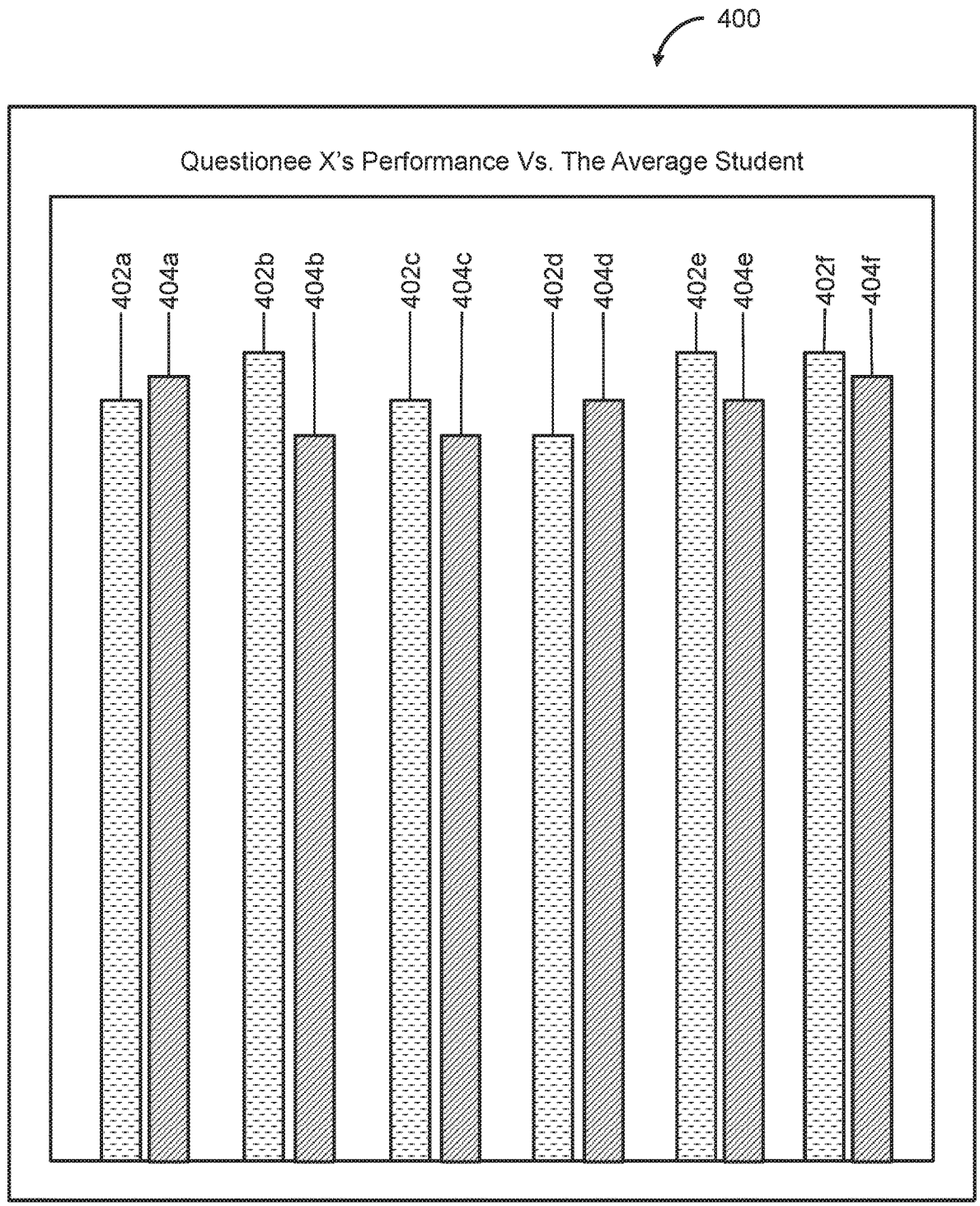
FIG. 4 is an exemplary illustration of a user interfaces that facilitate analysis and comparison of performance of questionees, in accordance with an aspect of the invention.

In one scenario, with respect to FIG. 4, user interface 400 may illustrate such a comparison where bars 402a-402f may represent performance metric values associated with Questionee X and bars 404a-404f may represent performance metric values associated with an "average" student. The performance metric values associated with Questionee X may, for example, comprise (1) amounts of time that Questionee X spent on particular questions (e.g., where at least one of bars 402a-402f represents an amount of time spent on one particular question), (2) amounts of time that Questionee X spent on particular question categories of the test (e.g., where at least one of bars 402a-402f represents an amount of time spent on one particular question category), (3) an amount of time that Questionee X spent on the overall test, (4) percentages of questions that Questionee X correctly answered in the particular question categories of the test, (5) a percentage of questions that Questionee X correctly answered in the overall test, or (6) other performance metric values. The performance metric values associated with the "average" student may comprise (1) average amounts of time that one or more other questionees (who took the test) within the same questionee group spent on the particular questions (e.g., where at least one of bars 404a-404f represents an average amount of time spent on one particular question, (2) average amounts of time that the other questionees spent on the particular question categories of the test (e.g., where at least one of bars 404a-404f represents an average amount of time spent on one particular question category), (3) an average amount of time that the other questionees spent on the test, (4) average percentages of questions that the other questionees correctly answered in the particular question categories of the test, (5) an average percentage of questions that the other questionees correctly answered in the overall test, or (6) other performance metric values. Bars 402a-402f may indicate absolute performance metric values or relative performance of Questionee X with respect to the performance of the "average" student. Likewise, bars 404a-404f may indicate absolute performance metric values or relative performance of the "average" student with respect to the performance of Questionee X. Other comparison techniques may additionally or alternatively be utilized (e.g., percentile comparison).

As another example, performance assessment subsystem 118 may compare performance of a questionee on a question of a test or a question category of the test with performance of one or more other questionees on the question or the question category even if the other questionees did not take the same test (e.g., the other questionees may have taken one or more different tests where each test comprises a different set of questions). With respect to FIG. 4, for example, user interface 400 may illustrate such a comparison where bars 402a-402f may represent performance metric values associated with Questionee X and bars 404a-404f may represent performance metric values associated with an "average" student. The performance metric values associated with Questionee X may comprise (1) amounts of time that Questionee X spent on particular questions of the test (e.g., where at least one of bars 402a-402f represents an amount of time spent on one particular question), (2) amounts of time that Questionee X spent on particular question categories of the test (e.g., where at least one of bars 402a-402f represents an amount of time spent on one particular question category), (3) an amount of time that Questionee X spent on the overall test, (4) percentages of questions that Questionee X correctly answered in the particular question categories of the test, (5) a percentage of questions that Questionee X correctly answered in the overall test, or (6)

other performance metric values. The performance metric values associated with the "average" student may comprise (1) average amounts of time that the other questionees spent on the particular questions (e.g., where at least one of bars 404a-404f represents an average amount of time spent on one particular question), (2) average amounts of time that the other questionees spent on the particular question categories of a similar test (e.g., similar in difficulty, duration, question category composition, etc.), (3) an average amount of time that the other questionees spent on the overall similar test, (4) average percentages of questions that the other questionees correctly answered in the particular question categories of the similar test, (5) an average percentage of questions that the other questionees correctly answered in the overall similar test, or (6) other performance metric values. In a further example, the other questionees (whose performance is compared with Questionee X's performance) may be selected (for comparison with Questionee X) based on a determination that the questionees are in the same or similar questionee group as Questionee X. Questionee X may, for example, be 6th grade student in a first school in a first state, and the other questionees may comprise 6th grade students in other schools across numerous states.

As yet another example, performance assessment subsystem 118 may compare performance of a group of questionees on a question with performance of one or more other questionees on the question (e.g., even if the questionees in the group of questions did not take the same test as one another, even if the other questionees did not take the same test as individual questions in the group of questionees, etc.). In one scenario, for example, the performance metric values of the group of questionees (to be compared with the performance metric values of the other questionees) may comprise (1) average amounts of time that the questionees in the group of questionees spent on particular questions, (2) average amounts of time that the questionees in the group of questionees spent on particular question categories of similar tests, (3) an average amount of time that the questionees in the group of questionees spent on the similar tests, (4) average percentages of questions that the questionees in the group of questionees correctly answered in the particular question categories of the similar tests, (5) an average percentage of questions that the questionees in the group of questionees correctly answered in the similar tests, or (6) other performance metric values. The performance metric values associated with the other questionees may comprise (1) average amounts of time that the other questionees spent on the particular questions, (2) average amounts of time that the other questionees spent on the particular question categories of the similar tests, (3) an average amount of time that the other questionees spent on the similar tests, (4) average percentages of questions that the other questionees correctly answered in the particular question categories of the similar tests, (5) an average percentage of questions that the other questionees correctly answered in the similar tests, or (6) other performance metric values.

In an implementation, performance of one or more instructors may be analyzed and/or compared to performance of one or more other instructors. As an example, performance of instructors may be determined based on performance of the respective students of the instructors. Performance metric values associated with an instructor may comprise (1) average amounts of time that the instructor's students spent on particular questions of a test, (2) average amounts of time that the instructor's students spent on particular question categories of the test, (3) an average amount of time that the instructor's students spent on the overall test, (4) average percentages of questions that the instructor's students correctly answered in the particular question categories of the test, (5) an average percentage of questions that the instructor's students correctly answered in the overall test, or (6) other performance metric values. Performance metric values associated with one or more other instructors (with which the performance metric values of the instructor may be compared) may comprise (1) average amounts of time that the other instructors' students spent on the particular questions, (2) average amounts of time that the other instructors' students spent on the particular question categories of similar tests, (3) an average amount of time that the other instructors' students spent on the similar tests, (4) average percentages of questions that the other instructors' students correctly answered in the particular question categories of the similar tests, (5) an average percentage of questions that the other instructors' students correctly answered in the similar tests, or (6) other performance metric values.

In one scenario, a teacher can log into a testing management system (or a performance assessment subsystem of the testing management system) and run analysis on his/her students' performance. Based on the analysis, the testing management system may provide a graphical representation of each student's performance (e.g., related to particular questions, particular question categories, etc.), a graphical comparison of the student's performance against other students (e.g., FIG. 4), or other graphical representations related to the performance of the teacher's students. In this way, the teacher may quickly and easily identify the strengths and weaknesses of each of his students (e.g., by question category or other criteria). Additionally, or alternatively, the teacher may quickly and easily identify strengths and weaknesses in his/her own teaching techniques and identify areas of improvement that he/she needs to make.

In another scenario, the teacher may run comparative analysis between his own performance as a teacher and other teachers (e.g., of the same grade and subject that use the same text book within the same school or any other school). For example, the testing management system may provide the teacher with a graphical comparison of an average performance of the teacher's students (e.g., on particular questions, on particular question categories of a test, or on the overall test) with an average performance of one or more other teachers' students (e.g., on the particular questions, the particular question categories of a similar test, or on the overall similar test). In a further scenario, the average performance comparison may compare (1) an average performance of a top percentile of the teacher's students (e.g., during a semester or other time period) with an average performance of the top percentile of one or more teachers' students, (2) average performance of a bottom percentile of the teacher's students with an average performance of a bottom percentile of the other teacher's students, (3) or other averages. Additionally, or alternatively, the testing management system may provide the teacher with a performance rating associated with the teacher (e.g., for a particular test, an overall semester or other time period, etc.), performance ratings associated with the other teachers, or other performance ratings. The performance ratings of the teacher and the other teachers may, for example, be determined based on the performance of their respective students.

In yet another scenario, school administrations can log into the testing management system and monitor the progress and performance of each teacher, class, section, and/or student at any time without having to enter a single classroom. The testing management system may also enable them to perform comparative analysis between sections, classes, and/or teachers within the same school or other schools. The testing management system may further enable them to easily identify whether a teacher is providing relatively easy questions to his/her students and whether the students are achieving average or below average results against those easy questions, or whether the teacher is truly giving the students challenging questions and whether the students are demonstrating attainment of the material by performing at or above average against the challenging questions. With such a testing management system, school administrations may quickly and easily identify their own strengths and weaknesses compared to other schools (e.g., of the same curriculum by grade and subject). As such, they can identify precisely and objectively what talent they need to attract to improve the quality of education in their institution, market themselves as a magnet school in a particular field (e.g., science, languages, arts, or other field depending on their relative strengths and weaknesses), etc.

It should be noted that, although some implementations described herein are with respect analysis and/or comparison of performance of instructors based on the performance of their respective students, it is understood that (to the extent possible) analysis and/or comparison of other entities (e.g., schools or other institutions, city, state, or other governing region, etc.) may also be based on the performance of their respective students (e.g., students studying at the institutions, students studying in the governing region, etc.). As an example, performance metric values associated with an entity may comprise (1) average amounts of time that the entity's students spent on particular questions, (2) average amounts of time that the entity's students spent on particular question categories of similar tests, (3) average amounts of time that the entity's students spent overall on the similar tests, (4) average percentages of questions that the entity's students correctly answered in the particular question categories of the similar tests, (5) average percentage of questions that the entity's students correctly answered in the similar tests, or (6) other performance metric values.

Exemplary Flowcharts

Figure 5:
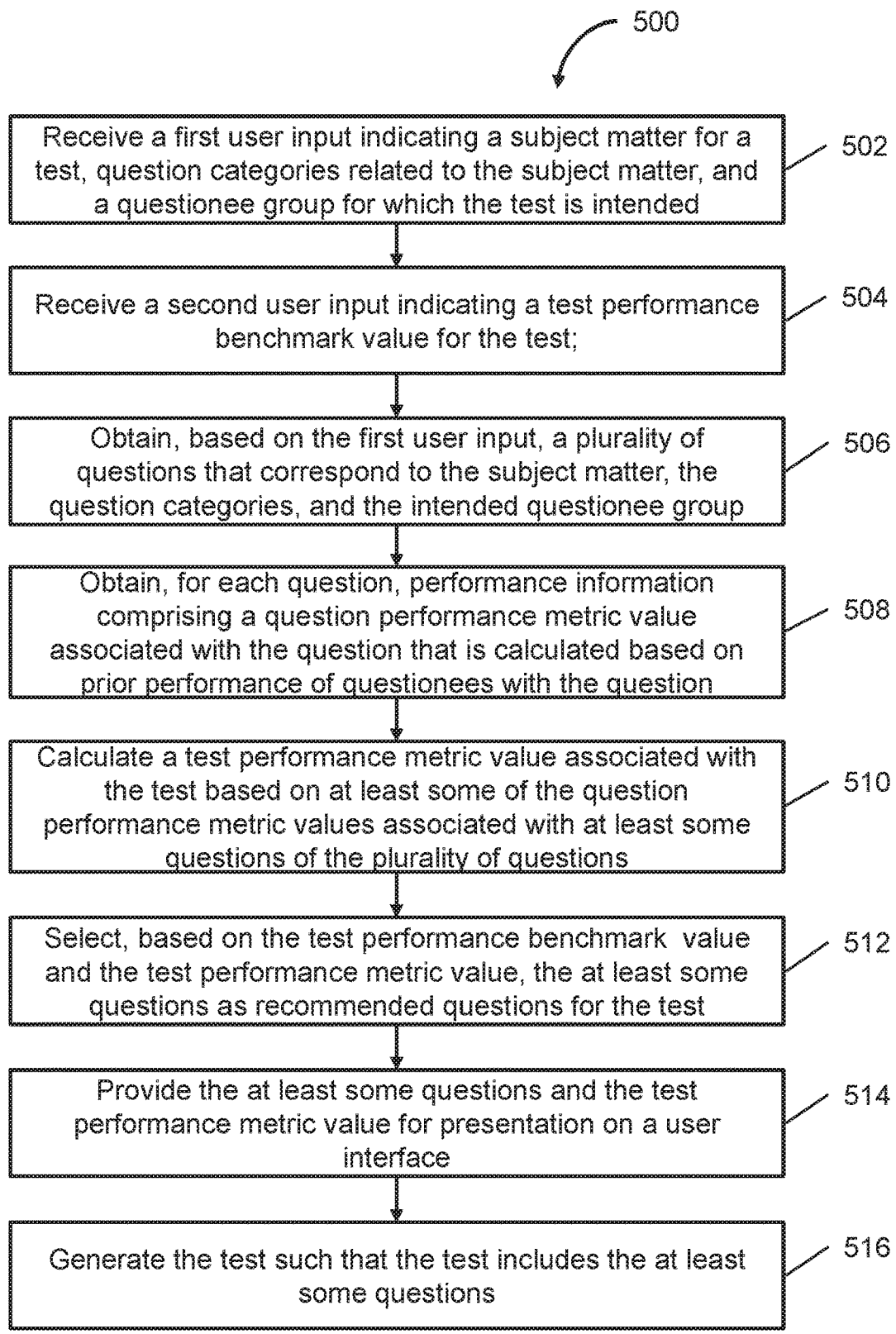
FIG. 5 is an exemplary illustration of a flowchart of a method of facilitating creation of an educational test based on prior performance with individual test questions, in accordance with an aspect of the invention.
Figure 6:
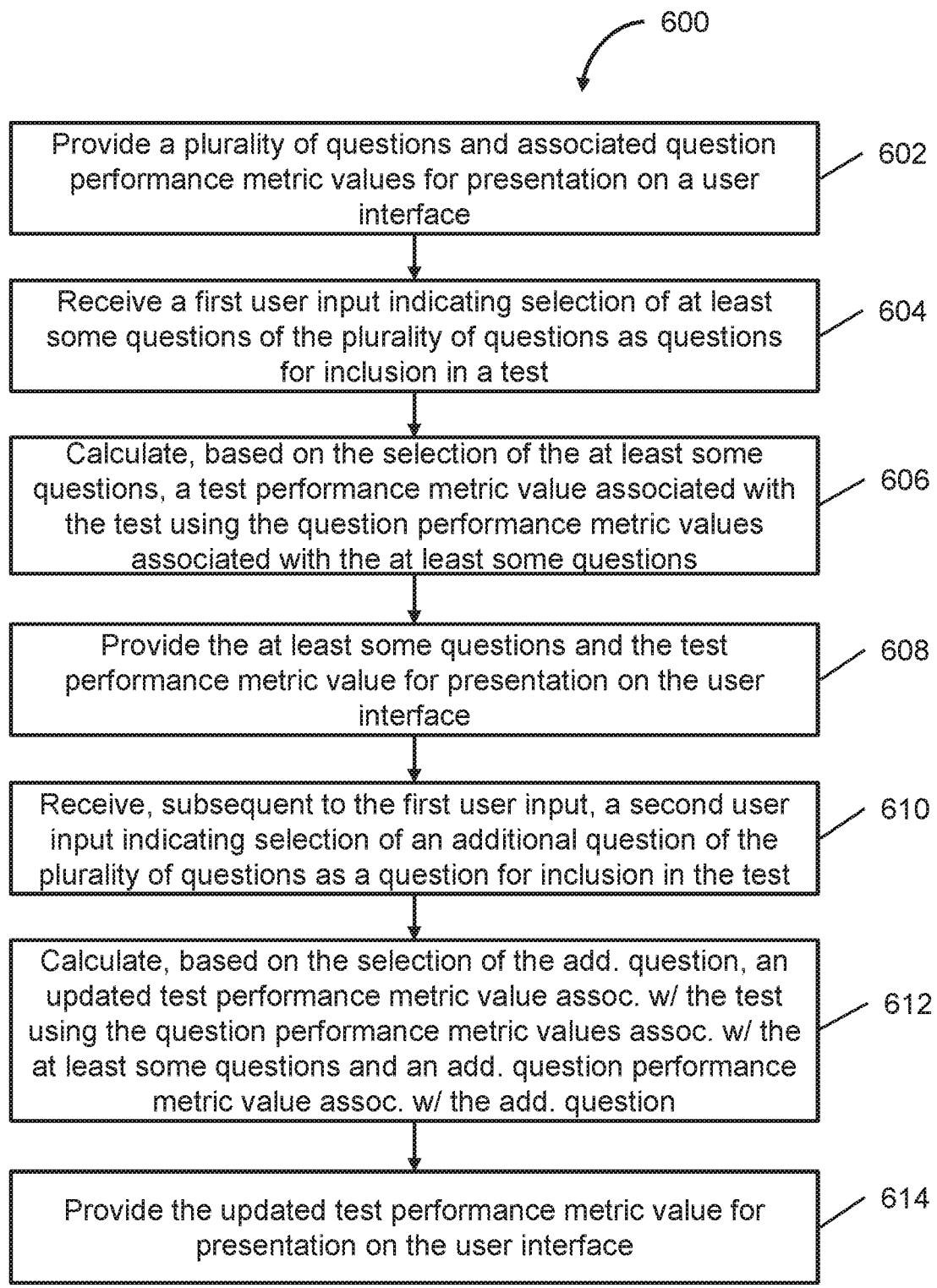
FIG. 6 is an exemplary illustration of a flowchart of a method of providing presentation of a test performance metric value associated with a test, in accordance with an aspect of the invention.
Figure 7:
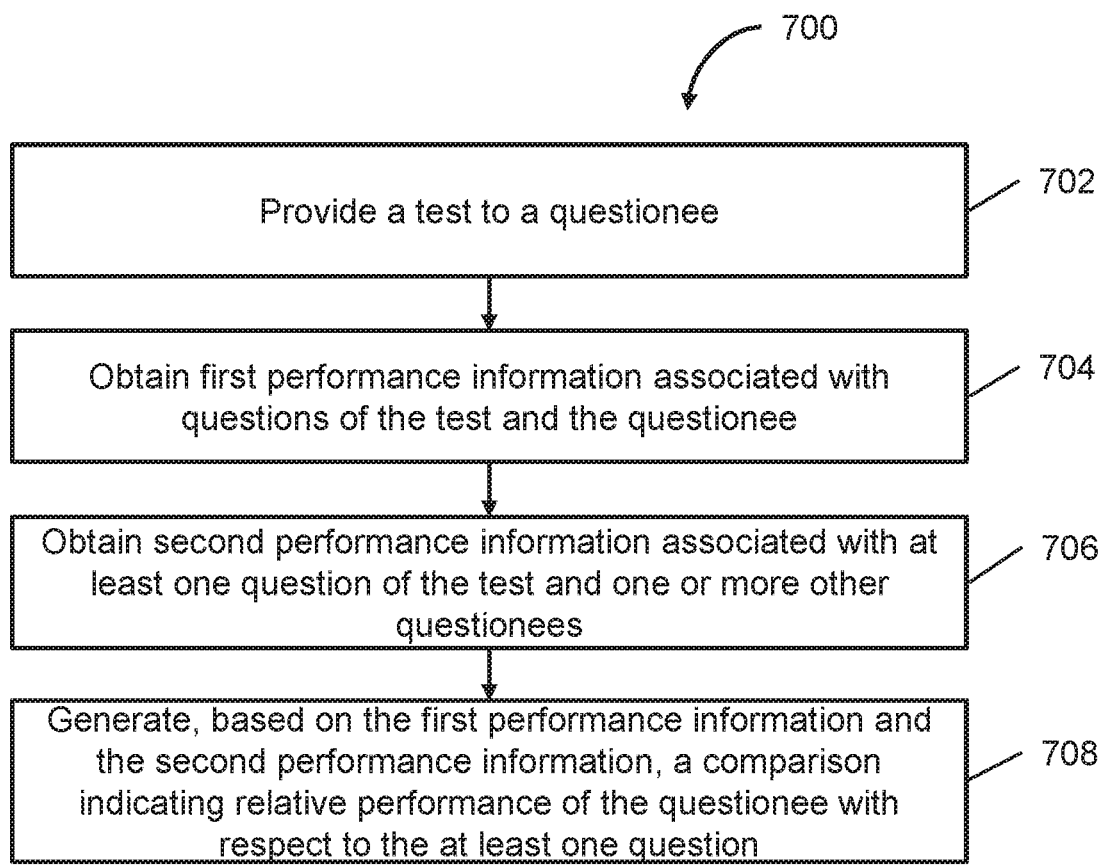
FIG. 7 is an exemplary illustration of a flowchart of a method of providing a comparison of performance of a questionee with performance of one or more other questionees, in accordance with an aspect of the invention.

FIGS. 5-7 comprise exemplary illustrations of flowcharts of processing operations of methods that enable the various features and functionality of the system as described in detail above. The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated (and described below) is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

FIG. 5 is an exemplary illustration of a flowchart 500 of a method of facilitating creation of an educational test based on prior performance with individual test questions, in accordance with an aspect of the invention.

In an operation 502, a first user input (indicating a subject matter for a test, one or more question categories related to the subject matter, and a questionee group for which the test is intended) may be received. Operation 502 may be performed by a test creation subsystem that is the same as or similar to test creation subsystem 114, in accordance with one or more implementations.

In an operation 504, a second user input indicating a test performance benchmark value for the test may be received. Operation 504 may be performed by a test creation subsystem that is the same as or similar to test creation subsystem 114, in accordance with one or more implementations.

In an operation 506, a plurality of questions that correspond to the subject matter, the question categories, and the intended questionee group may be obtained based on the first user input. Operation 506 may be performed by a question management subsystem that is the same as or similar to question management subsystem 112, in accordance with one or more implementations.

In an operation 508, performance information (comprising a question performance metric value associated with the question that is calculated based on prior performance of questionees with the question) may be obtained for each question of the plurality of questions. In an implementation, for each question of the plurality of questions, the question performance metric value may comprise at least one of (i) an amount of time estimated for a questionee to correctly answer the question or (ii) an amount of time estimated for a questionee to incorrectly answer the question. The amount of time for a questionee to correctly answer the question may be estimated based on one or more prior amounts of time that the questionees took to correctly answer the question. The amount of time for a questionee to incorrectly answer the question may be estimated based on one or more prior amounts of time that the questionees took to incorrectly answer the question. In another implementation, for each of the plurality of questions, the question performance metric value may comprise a question difficulty level associated with the question that is estimated based on the prior performance of the questionees with the question. Operation 508 may be performed by a test creation subsystem that is the same as or similar to test creation subsystem 114, in accordance with one or more implementations.

In an operation 510, a test performance metric value associated with the test may be calculated based on at least some of the question performance metric values associated with at least some questions of the plurality of questions. In an implementation, the test performance metric value may comprise an amount of time for a questionee to complete the test. The calculation of the test performance metric value may comprise estimating the amount of time for a questionee to complete the test based on at least one of (i) the amounts of time estimated for a questionee to correctly answer the at least some questions or (ii) the amounts of time estimated for a questionee to incorrectly answer the at least some questions. In another implementation, the test performance metric value may comprise a test difficulty level associated with the test. The calculation of the test performance metric value may comprise estimating the test difficulty level based on the question difficulty levels associated with the at least some questions. Operation 510 may be performed by a performance assessment subsystem that is the same as or similar to test creation subsystem 118, in accordance with one or more implementations.

In an operation 512, the at least some questions may be selected as recommended questions (for inclusion in the test) based on the test performance benchmark value and the test performance metric value. Operation 512 may be performed by a test creation subsystem that is the same as or similar to test creation subsystem 114, in accordance with one or more implementations.

In an operation 514, the at least some questions and the test performance metric value may be provided for presentation on a user interface. Operation 514 may be performed by a test creation subsystem that is the same as or similar to test creation subsystem 114, in accordance with one or more implementations.

In an operation 516, the test may be generated such that the test includes the at least some questions. Operation 516 may be performed by a test creation subsystem that is the same as or similar to test creation subsystem 114, in accordance with one or more implementations.

FIG. 6 is an exemplary illustration of a flowchart 600 of a method of providing presentation of a test performance metric value associated with a test, in accordance with an aspect of the invention.

In an operation 602, a plurality of questions and performance metric values associated with the plurality of questions may be provided for presentation on a user interface. Operation 602 may be performed by a test creation subsystem that is the same as or similar to test creation subsystem 114, in accordance with one or more implementations.

In an operation 604, a first user input indicating selection of at least some questions of the plurality of questions (as questions for inclusion in a test) may be received. Operation 604 may be performed by a test creation subsystem that is the same as or similar to test creation subsystem 114, in accordance with one or more implementations.

In an operation 606, a test performance metric value associated with the test may calculated (based on the selection of the at least some questions) using the question performance metric values associated with the at least some question. Operation 606 may be performed by a performance assessment subsystem that is the same as or similar to performance assessment subsystem 118, in accordance with one or more implementations.

In an operation 608, the at least some questions and the test performance metric value may be provided for presentation on the user interface. Operation 608 may be performed by a test creation subsystem that is the same as or similar to test creation subsystem 114, in accordance with one or more implementations.

In an operation 610, a second user input indicating selection of an additional question of the plurality of questions (as a question for inclusion in the test) may be received subsequent to the first user input. Operation 610 may be performed by a test creation subsystem that is the same as or similar to test creation subsystem 114, in accordance with one or more implementations.

In an operation 612, an updated test performance metric value associated with the test may be calculated (based on the selection of the additional question) using the question performance metric values associated with the at least some questions and an additional question performance metric value associated with the additional question. Operation 612 may be performed by a performance assessment subsystem that is the same as or similar to performance assessment subsystem 118, in accordance with one or more implementations.

In an operation 614, the updated test performance metric value may be provided for presentation on the user interface.

Operation 614 may be performed by a test creation subsystem that is the same as or similar to test creation subsystem 114, in accordance with one or more implementations.

FIG. 7 is an exemplary illustration of a flowchart 700 of a method of providing a comparison of performance of a questionee with performance of one or more other questionees, in accordance with an aspect of the invention.

In an operation 702, a test may be provided to a questionee. As an example, the provided test may comprise one or more questions from a plurality of questions that correspond to a subject matter, question categories related to the subject matter, a questionee group for which the test is intended, or other criteria selected by a user. Operation 702 may be performed by a test administration subsystem that is the same as or similar to test administration subsystem 116, in accordance with one or more implementations.

In an operation 704, first performance information associated with questions of the test and the questionee may be obtained. Operation 704 may be performed by a performance assessment subsystem that is the same as or similar to performance assessment subsystem 118, in accordance with one or more implementations.

In an operation 706, second performance information associated with at least one question of the test and one or more other questionees may be obtained. Operation 706 may be performed by a performance assessment subsystem that is the same as or similar to performance assessment subsystem 118, in accordance with one or more implementations.

In an operation 708, a comparison indicating relative performance of the questionee with respect to the at least one question may be generated based on the first performance information and the second performance information. Operation 708 may be performed by a performance assessment subsystem that is the same as or similar to performance assessment subsystem 118, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

What is claimed is:

1. A system for facilitating creation of an educational test based on prior performance with individual test questions, the system comprising:
one or more physical processors programmed to execute computer program instructions which, when executed, cause the one or more physical processors to:
generate a user interface configured to receive a set of parameters for the test, the set of parameters comprising a subject matter of the test, one or more question categories for the test, and a questionee group for which the test is intended;
receive, via the user interface, a first user input from a user indicating the subject matter, the one or more question categories, and the questionee group;
obtain, based on the first user input, a set of questions that correspond to the subject matter, the one or more question categories, and the intended questionee group;

obtain, for questions of the set of questions, performance information associated with the question, wherein the performance information comprises a question performance metric value associated with the question that is calculated based on prior performance of one or more questionees with the question;

display, via a user interface, a selectable listing of the set of questions;

receive, via the selectable listing of the user interface, a first selection of a first question from among the set of questions, the first question having a first question performance metric value;

add the first question to the test based on the first selection;

calculate a test performance metric value associated with the test based on at least the first question performance metric value;

provide the test performance metric value for presentation on the user interface;

receive, via the user interface, a second selection of a second question from among the set of questions, the second question having a second question performance metric value;

add the second question to the test based on the second selection;

update the test performance metric value associated with the test based on the second question performance metric value;

provide the updated test performance metric value via the user interface;

receive a second user input from the user indicating a target level of difficulty for the test;

determine a current level of difficulty for the test based on at least the first question and the second question;

identify one or more questions each associated with its own level of difficulty, recommended for inclusion in the test based on the current level of difficulty of the test, and the level of difficulty for each of the one or more questions such that inclusion of the one or more questions will result in the target level of difficulty for the test being achieved; and display a recommendation to include the identified one or more questions in the test via the user interface.

2. The system of claim 1, wherein the plurality of questions comprises one or more questions that correspond to a plurality of questionee groups, and wherein each of the plurality of questionee groups correspond to a different educational level.

3. The system of claim 1, wherein the one or more physical processor are further caused to:
receive another user input from the user indicating a test performance benchmark value for the test; and
select, based on the test performance benchmark value and the test performance metric value, the at least some questions as questions recommended for inclusion in the test.

4. The system of claim 3, wherein the test performance benchmark value relates to a duration of the test.

5. The system of claim 1, wherein the one or more physical processors are further caused to:
provide the plurality of questions and the question performance metric values associated with the plurality of questions for presentation on the user interface;
receive a third user input from the user indicating selection of the at least some questions as questions for inclusion in the test;

receive, subsequent to the third user input, a fourth user input from the user indicating selection of an additional question of the plurality of questions as a question for inclusion in the test;
calculate an updated test performance metric value associated with the test based on the question performance metric values associated with the at least some questions and an additional one of the question performance metric values associated with the additional question; and
provide the updated test performance metric value for presentation on the user interface.

6. The system of claim 1, wherein, for each question of the plurality of questions, the question performance metric value comprises at least one of an amount of time estimated for a questionee to correctly answer the question or an amount of time estimated for a questionee to incorrectly answer the question, and wherein the amount of time for a questionee to correctly answer the question is estimated based on one or more prior amounts of time that the one or more questionees took to correctly answer the question, and the amount of time for a questionee to incorrectly answer the question is estimated based on one or more prior amounts of time that the one or more questionees took to incorrectly answer the question.

7. The system of claim 6, wherein the test performance metric value comprises an amount of time for a questionee to complete the test, and wherein calculating the test performance metric value comprises estimating the amount of time for a questionee to complete the test based on at least one of (i) the amounts of time estimated for a questionee to correctly answer the at least some questions or (ii) the amounts of time estimated for a questionee to incorrectly answer the at least some questions.

8. The system of claim 1, wherein, for each of the plurality of questions, the question performance metric value comprises a question difficulty level associated with the question that is estimated based on the prior performance of the one or more questionees with the question.

9. The system of claim 8, wherein the test performance metric value comprises a test difficulty level associated with the test, and wherein calculating the test performance metric value comprises estimating the test difficulty level based on the question difficulty levels associated with the at least some questions.

10. The system of claim 1, wherein, for each question of the plurality of questions, the performance metric value is calculated with respect to the intended questionee group, and wherein each of the one or more questionees is a questionee of the intended questionee group at the time the questionee of the intended questionee group answered the question.

11. The system of claim 1, wherein the one or more physical processors are further caused to:
provide the test to a first questionee;
obtain first performance information associated with the at least some questions and the first questionee, wherein the first performance information comprises, for each question of the at least some questions, a first question performance metric value associated with the question and the first questionee; and
update, for at least one question of the at least some questions, the question performance metric value associated with the at least one question based on the first performance metric value associated with the at least one question and the first questionee.

12. The system of claim 1, wherein the one or more physical processors are further caused to:
provide the test to a first questionee;
obtain first performance information associated with the at least some questions and the first questionee, wherein the first performance information comprises, for each question of the at least some questions, a first question performance metric value associated with the question and the first questionee;
obtain second performance information associated with at least one question of the at least some questions and one or more other questionees; and
generate, based on the first performance information and the second performance information, a comparison indicating performance of the first questionee relative to performance of one or more other questionees with respect to the at least one question.

13. The system of claim 1, wherein the one or more physical processors are further caused to:
provide the test to a first questionee associated with a first entity, wherein the first entity is an entity other than the first questionee;
obtain first performance information associated with the at least some questions and the first questionee, wherein the first performance information comprises, for each question of the at least some questions, a first question performance metric value associated with the question and the first questionee;
obtain second performance information associated with at least one question of the at least some questions and one or more other questionees, wherein the one or more questionees are associated with one or more other entities other than the one or more questionees; and
generating, based on the first performance information and the second performance information, a comparison indicating performance of the first entity relative to performance of the one or more other entities with respect to the at least one question.

14. The system of claim 13, wherein the first entity is an instructor of the first questionee, and the one or more other entities are one or more instructors of the one or more other questionees, and wherein the generated comparison indicates performance of the instructor of the first questionee relative to performance of the one or more instructors of the one or more other questionees with respect to the at least one question.

15. The system of claim 13, wherein the first entity is an institution of the first questionee, and the one or more other entities are one or more institutions of the one or more other questionees, and wherein the generated comparison indicates performance of the institution of the first questionee relative to performance of the one or more institutions of the one or more other questionees with respect to the at least one question.

16. A method for facilitating creation of an educational test based on prior performance with individual test questions, the method being implemented on a computer system that includes one or more physical processors executing computer program instructions which, when executed, cause the one or more physical processors to perform the method, the method comprising:
generating, by the computer system, a user interface configured to receive a set of parameters for the test, the set of parameters comprising a subject matter of the test, one or more question categories for the test, and a questionee group for which the test is intended;
receiving, by the computer system, via the user interface, a first user input from a user indicating the subject matter, the one or more question categories, and the questionee group;
obtaining, by the computer system, based on the first user input, a set of questions that correspond to the subject matter, the one or more question categories, and the intended questionee group;
obtaining, by the computer system, for questions of the set of questions, performance information associated with the question, wherein the performance information comprises a question performance metric value associated with the question that is calculated based on prior performance of one or more questionees with the question;
displaying, by the computer system, via a user interface, a selectable listing of the set of questions;
receiving, by the computer system, via the selectable listing of the user interface, a first selection of a first question from among the set of questions, the first question having a first question performance metric value;
adding, by the computer system, the first question to the test based on the first selection;
calculating, by the computer system, a test performance metric value associated with the test based on at least the first question performance metric value; and
providing, by the computer system, the test performance metric value for presentation on the user interface;
receiving, by the computer system, via the user interface, a second selection of a second question from among the set of questions, the second question having a second question performance metric value;
adding, by the computer system, the second question to the test based on the second selection;
updating, by the computer system, the test performance metric value associated with the test based on the second question performance metric value;
providing, by the computer system, the updated test performance metric value via the user interface;
receiving, by the computer system, a second user input from the user indicating a target level of difficulty for the test;
determining, by the computer system, a current level of difficulty for the test based on at least the first question and the second question;
identifying, by the computer system, one or more question each associated with its own level of difficulty, recommended for inclusion in the test based on the current level of difficulty for the test, the target level of difficulty of the test, and the level of difficulty for each of the one or more questions such that inclusion of the one or more questions will result in the target level of difficulty being achieved; and
displaying, by the computer system, a recommendation to include the identified one or more questions in the test via the user interface.

17. The method of claim 16, wherein the plurality of questions comprises one or more questions that correspond to a plurality of questionee groups, and wherein each of the plurality of questionee groups correspond to a different educational level.

18. The method of claim 16, wherein the method further comprises:
receiving, by the computer system, another user input from the user indicating a test performance benchmark value for test; and selecting, by the computer system, based on the test performance benchmark value and the test performance metric value, the at least some questions as questions recommended for inclusion in the test.

19. The method of claim 18, wherein the test performance benchmark value relates to at least one of a duration of the test or a test difficulty associated with the test.

20. The method of claim 16, wherein the method further comprises:
providing, by the computer system, the plurality of questions and the question performance metric values associated with the plurality of questions for presentation on the user interface;
receiving, by the computer system, a third user input from the user indicating selection of the at least some questions as questions for inclusion in the test;
receiving, by the computer system, subsequent to the third user input, a fourth user input from the user indicating selection of an additional question of the plurality of questions as a question for inclusion in the test;
calculate an updated test performance metric value associated with the test based on the question performance metric values associated with the at least some questions and an additional one of the question performance metric values associated with the additional question; and
provide the updated test performance metric value for presentation on the user interface.

21. The method of claim 16, wherein, for each question of the plurality of questions, the question performance metric value comprises at least one of (i) an amount of time estimated for a questionee to correctly answer the question or (ii) an amount of time estimated for a questionee to incorrectly answer the question, and wherein the amount of time for a questionee to correctly answer the question is estimated based on one or more prior amounts of time that the one or more questionees took to correctly answer the question, and the amount of time for a questionee to incorrectly answer the question is estimated based on one or more prior amounts of time that the one or more questionees took to incorrectly answer the question.

22. The method of claim 16, wherein, for each of the plurality of questions, the question performance metric value comprises a question difficulty level associated with the question that is estimated based on the prior performance of the one or more questionees with the question.

23. The method of claim 16, wherein, for at least the first question, the first question performance metric value is calculated with respect to a first intended questionee group based on performance on the first question by first questionees in the first intended questionee group that answered the first question, the method further comprising:
generating, by the computer system, another question performance metric value, different from the first question performance metric value, for the first question with respect to a second intended questionee group based on performance on the first question by second questionees in the second intended questionee group that answered the first question such that performance of the first question is assessed differently for different questionee groups that answered the first question.

24. The system of claim 1, wherein the plurality of parameters further comprise a percentage of each of the one or more question categories that should make up the test, and wherein to obtain the plurality of questions, the one or more physical processors are further caused to:
obtain a first percentage of a first question category of questions based on the percentage of each of the one or more question categories that should make up the test; and
obtain a second percentage of a second question category of questions based on the percentage of each of the one or more question categories that should make up the test.

25. The system of claim 1, wherein the one or more physical processors are further caused to:
obtain a predefined composition of categories of subject matter to be provided to the intended questionee group;
identify a set of questions to be added to the test based on the predefined composition of categories of subject matter; and
provide a recommendation to add one or more questions from the set of questions.

26. The system of claim 25, wherein to obtain the predefined composition of categories of subject matter, the one or more physical processors are further caused to:
obtain a syllabus provided to students who are members of the intended questionee group.

27. The system of claim 25, wherein to obtain the predefined composition of categories of subject matter, the one or more physical processors are further caused to:
obtain homework assignments provided to students who are members of the intended questionee group, wherein categories of questions in the home assignments are used as a basis for the predefined composition of categories of subject matter.

28. The system of claim 25, wherein to obtain the predefined composition of categories of subject matter, the one or more physical processors are further caused to:
obtain quizzes provided to students who are members of the intended questionee group, wherein categories of questions in the quizzes are used as a basis for the predefined composition of categories of subject matter.

29. The system of claim 1, wherein the user interface is further configured to receive a new question, and wherein the one or more physical processors are further caused to:
add the new question to the test;
add the new question to a question database from which the plurality of questions were obtained;
monitor answers to the new question; and
generate a new question performance metric value for the new question based on the monitored answers.

* * * * *